MARCAR WAHRAM BEYLIKGY, OF NEW YORK, N. Y.

Letters Patent No. 100,005, dated February 22, 1870.

IMPROVEMENT IN THE MANUFACTURE OF WATER-PROOF FABRICS FROM WASTE RUBBER.

The Schedule referred to in these Letters Patent and making part of the same

*To all whom it may concern:*

Be it known that I, MARCAR WAHRAM BEYLIKGY, of the city, county, and State of New York, have invented a new and useful Improvement in the Manufacture of Water-Proof Fabrics from Refuse Rubber; and I do hereby declare that the following is a full, clear, and exact description thereof, which will enable others skilled in the art to make and use the same.

The object of this invention is to utilize the shavings and refuse of rubber goods in the production of a new and useful fabric.

It is well known that ordinary vulcanized caoutchouc ceases to soluble by the same liquids which dissolved it before, but that such liquids will only cause the rubber to swell and soften. When the liquid is evaporated the rubber will become as hard as before, and resume the original form.

When the vulcanized rubber is for a number of days exposed to a temperature of about 250° Fahrenheit, it undergoes some structural transformation, loosing its rigidity and tenacity, and becoming an adhesive mass insoluble in water and alcohol, partially soluble in ether, but wholly soluble in heated tupentine oil, benzole, caoutchoucine, and other essential oils.

This softened rubber which I shall call "caoutchoucite," to distinguish it from the ordinary rubber, of which it appears to be only an isomeric modification, is susceptible of vulcanization by any of the well-known processes of sulphurizing. It only requires higher temperature or more time than for the vulcanization of ordinary rubber. The product will be as little adhesive and soluble, but less tough, as ordinary vulcanized rubber.

The caoutchoucite may be vulcanized like caoutchouc at ordinary temperature under the action of chloride of sulphur diluted with sixty and even a hundred times its weight of sulphide of carbon. This can, however, not be done if the caoutchoucite is dissolved in turpentine oil unless reactive medium is in large excess.

The caoutchoucite is left for a number of days in the oil of turpentine, the same being mixed with a strong solution of potassa or soda. The rubber then coagulates into a jelly, which separates an elastic and somewhat tenacious pellicle on boiling the mixture. This fact shows that under some circumstances the caoutchoucite may be vulcanized with its original quantity of sulphur at a comparatively lower temperature than is otherwise required.

The said properties of the caoutchoucite of being adhesive and soluble in many ordinary dissolvents, as well as the facility of vulcanizing in the ordinary manner, and thus to obtain the properties of common vulcanized rubber will make it a valuable article for many purposes, but especially for the manufacture of water-proof fabrics and as water-proof layers for fabrics.

The refuse rubber can thus be utilized in some important manufactures, while at present they are entirely lost in vast quantities.

The following is a description of the method of vulcanizing the caoutchoucite and of applying it to fabrics:

The shavings or any kind of destroyed fabrics or refuse of ordinary vulcanized rubber are first cut into small pieces, and put into a vessel with so much rectified oil of turpentine that they are entirely submerged in the liquid.

After the rubber has been covered with its lid, heat is applied by suitable means to produce a constant temperature of about 230° Fahrenheit. While heated, the mixture is stirred by a rapid motion of an agitator of suitable construction, rotated by suitable means. The rubber decreases in bulk and finally dissolves in the oil; more rubber is then added, and the digestion continued until the dissolution is accomplished, which will last no longer than ten or twelve hours. The vessel is then connected with the condensing chamber of a still, in order to recover most of the oil of turpentine. This distillation cannot be carried on at the temperature corresponding to the boiling point of the oil of turpentine in the ordinary condition of atmospheric pressure, experience having shown that in that temperature the two kinds of hydrocarbon which constitute the rubber are separated, the less soluble part being thrown to the bottom, the rubber having lost its quality, and the components being no more uniformly diffused throughout the whole mass.

The distillation should therefore be performed at a temperature not exceeding 230° Fahrenheit, in a corresponding vacuum. The process may be greatly simplified by distilling with steam, which runs through the boiling vessel, evaporates the oil of turpentine, which separates spontaneously on condensing the vaporous mixture. But the consumption of fuel will in this case be far more considerable for a given amount of rubber, than what is necessary for the motion of an air-pump.

The residue of distillation is caoutchoucite varnish, more or less pure according to the quality of materials employed.

By the foregoing process, the transformation of vulcanized caoutchouc into caoutchoucite is considerably facilitated, and may be still more accelerated by the addition of dissolvent agents in place of mere exposure to the dry heat. This method has still another advantage of purifying the rubber and separating it from the foreign matters with which many fabrics are mixed. For this purpose the solution is strained and decanted before it is allowed to concentrate. The separation of coloring matters is unnecessary for black colored varnishes, so that destroyed rubber shoes may be regarded as the most economical black-coloring material.

The caoutchoucite may as aforementioned be vulcanized either by hot or cold way. To apply the first process, the best way is to effect the complete separation of two components of caoutchoucite, in order to perform the vulcanization at lower temperature and in shorter time. For this purpose, as soon as the dissolution of rubber in the oil of turpentine is completed and the stirrer arrested and the boiler connected with still, the temperature is raised to the boiling-point of turpentine oil, and the varnish kept in full ebullition for about half an hour and left to cool. After the insoluble part is precipitated, which is completed in two or three days, the clear solution is drawn off and submitted to concentration in the manner above described. The solution is, however, previously mixed with three pounds of sulphur for every hundred weight of rubber employed. When the varnish has acquired the necessary thickness it is removed from the boiler.

After the fabrics have been overlaid with this varnish, they are submitted to heat, which is gradually increased from 212° to 390° Fahrenheit during about one hour. Only that side of the cloth fabric which is covered with the rubber layer should be exposed to the heat.

For the vulcanization in ordinary temperature, the caoutchoucite is reduced to a thick varnish, no separation of its ingredients nor addition of sulphur being required. After the fabrics are overlaid with and dried, they are immersed successively in three reservoirs, which are connected with each other; the first being filled with a mixture of one part of chloride of sulphur with eighty or one hundred parts of sulphide of carbon; the second with alcohol containing a small quantity of ammonia, and the last with water. The fabrics remain about ten minutes in each reservoir, and they are by the contents of the same vulcanized and washed. Finally they are dried by exposure to dry heat of about 115° Fahrenheit.

The object of the above combination is in the first place the recovering of the sulphide of carbon in distilling the alcohol after it has been saturated. The alcohol will be also recovered by distilling the water, so that the fabrics may at once be dried. The rubber layer swelled by sulphide of carbon cannot be dried speedily, as the expansive power of that fluid would burst the layer and injure the fabrics.

For want of sulphide of carbon, chloroform or crude benzole may be used, and methylic alcohol may be used for ethylic.

Having thus described my invention,

I claim as new, and desire to secure by Letters Patent—

1. The herein-described method of utilizing refuse rubber by applying it to the manufacture of waterproof fabrics, as set forth.

2. The regained rubber refuse called caoutchoucite, obtained substantially in the manner herein shown and described.

3. The herein-described method of recovering the solvent of chloride of sulphur after the same has been used for vulcanizing rubber, as set forth.

The above specification of my invention signed by me this 29th day of December, 1869.

MARCAR WAHRAM BEYLIKGY.

Witnesses:
GEO. W. MABEE,
ALEX. F. ROBERTS.